Dec. 6, 1927.

C. E. SWENSON 1,651,850

UNIVERSAL JOINT ASSEMBLY

Filed Jan. 5, 1925

Inventor:
Carl E. Swenson
By Wilson & McCune
Attys.

Patented Dec. 6, 1927.

1,651,850

UNITED STATES PATENT OFFICE.

CARL E. SWENSON, OF ROCKFORD, ILLINOIS, ASSIGNOR OF ONE-FOURTH TO CARL L. ANDERSON, ONE-FOURTH TO LEVIN FAUST, AND ONE-FOURTH TO ERIC S. EKSTROM, OF ROCKFORD, ILLINOIS.

UNIVERSAL-JOINT ASSEMBLY.

Application filed January 5, 1925. Serial No. 485.

This invention relates in general to the propeller shaft group of a motor vehicle and has more particular reference to what is known as the universal-joint assembly.

Heretofore it has been customary to connect the transmission or equivalent shaft with the axle-driving shaft through the intermediary of a universal-joint assembly comprising a front and a rear universal-joint and an interposed propeller shaft or tube, the front universal-joint being connected to the transmission shaft and the rear universal joint to the axle shaft. The conventional connection between the transmission and axle shafts and the adjoining yokes of the front and rear universal joints comprised flanged coupling members bolted together. If any other construction were employed it became necessary, so far as I am aware, to disassemble either one or both of the universal joints when installing or removing them.

My present invention aims to simplify and improve the construction of universal-joint assemblies with the view first to reduce the cost of production thereof and secondly to facilitate the installation and dismantling of such assemblies. The first purpose is accomplished by eliminating at least one set of flanged coupling members, and the second by the provision of certain improvements in the construction and organization of parts whereby the universal-joint assembly may be installed or removed from position without disassembling either one of the universal-joints.

Other objects and attendant advantages will be appreciated by those skilled in this art as the invention becomes better understood by reference to the following description when considered in connection with the accompanying drawing, in which—

Figure 1:
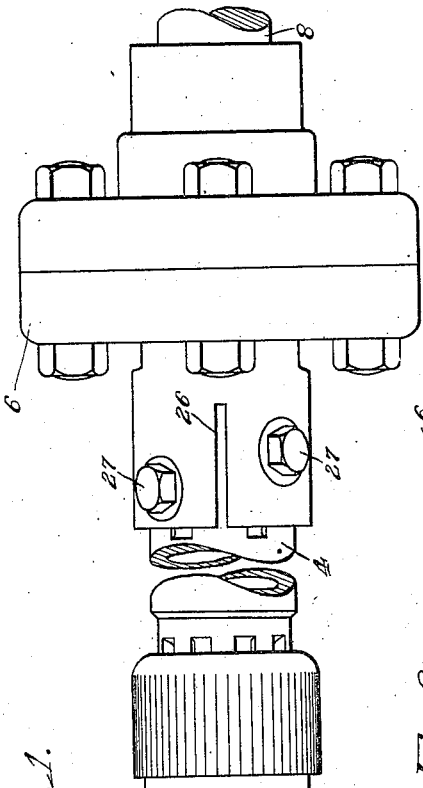
Figure 1, is a side elevation of a universal-joint assembly, embodying my invention.

The principal parts of the propeller shaft group are the propeller shaft or tube 4, the front universal joint 5 connected to the front end of the propeller shaft, and the rear universal joint 6 connected to the rear end of the propeller shaft. These parts are interposed between and connected to the transmission shaft 7 and the axle-driving shaft 8, or equivalent shafts. These shafts are in normally fixed, spaced relation.

It is the purpose of the present invention as explained briefly above to provide a practical assembly of said parts whereby they may be installed or removed with the respective universal-joints intact, that is, without the necessity of disassembling them or any parts thereof, also to eliminate at least one of the flanged couplings heretofore employed in constructions of this kind. The universal-joints per se might be of any suitable construction, preferably of the trunnion type having terminal yokes. The particular universal-joint shown herein is one of the trunnion type in which the trunnions are carried by the yokes and connected by a ring, the construction shown constituting the subject matter of Patent No. 1,450,707 dated April 3, 1923.

While the conventional mechanical universal-joint is of the trunnion type, the trunnions being carried either by the terminal yokes or a center cross in which case the trunnion bearings are carried by the terminal yokes, these are present in one form or another in this class of joints and will, therefore, be referred to herein as applying to any universal-joint.

In the present embodiment of my invention I employ a single flanged coupling or connection between one of the universal-joints and either the driving or driven shaft, in this case the flanged connection being between the driving or transmission shaft 7 and the adjoining yoke or terminal coupling member 9 of the front universal-joint. This connection comprises a flange 11 suitably secured to the shaft 7 and a complemental flange 12 integral with the yoke 9, the flanges being suitably secured together as by bolts 13. The rear yoke of the front universal-joint may be suitably connected to the front end of the propeller shaft as by a conventional slip or splined connection shown.

Figure 2:
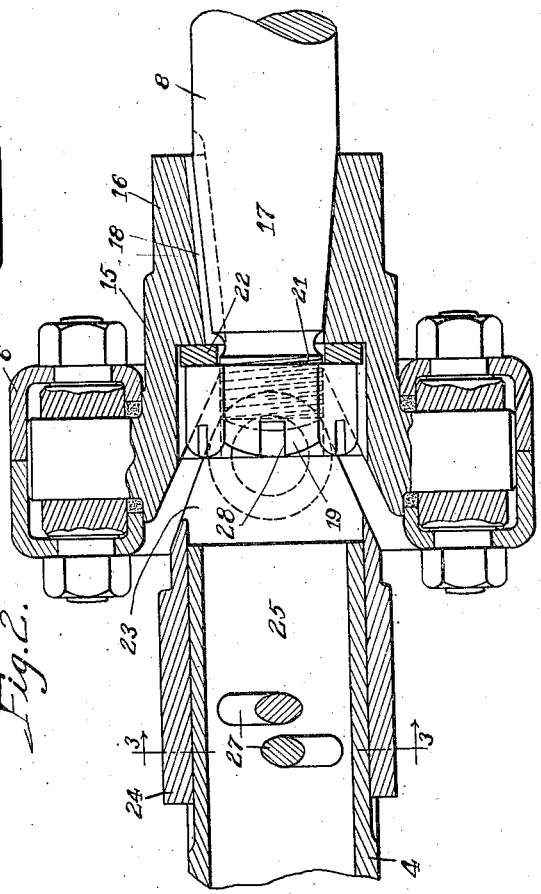
Fig. 2, is an enlarged longitudinal sectional view through the rear universal joint showing its connection to the propeller shaft and the axle-driving shaft.
Figure 3:
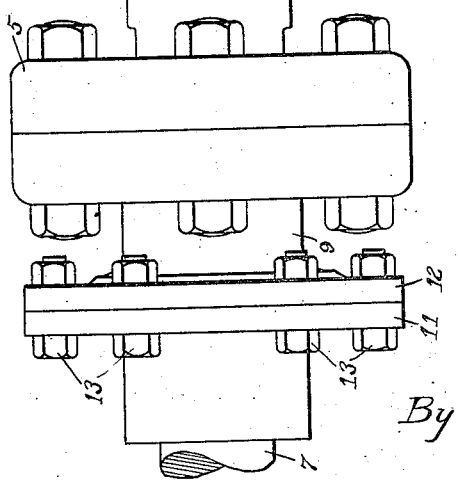
Fig. 3, is a cross-section taken on the line 3—3 of Fig. 2.
Figure 3:
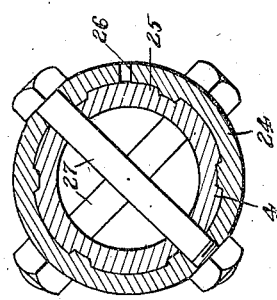

Referring now to Fig. 2, it will be seen that the rear yoke of the rear universal-joint is directly connected to the axle-driving shaft 8. To this end the hub 16 of the rear yoke 15, tapered to fit on the tapered end of said shaft 8, is connected thereto by a key 18 and a nut 19 screwed onto the threaded end 21 of the shaft. A split lock washer 22 interposed between the yoke hub 16 and the nut prevents loosening of the latter. This nut may be screwed on or off in the manner presently described. The front yoke 23 of this universal-joint has a slip connection to the rear end of the propeller shaft 4. In this instance the yoke 23 has a hub 24 internally splined to receive the splined end 25 of the propeller shaft. The hub 24 is slotted longitudinally at 26 and one or more clamping bolts 27 are passed diametrically through the hub and shaft to clamp the former to the latter and to insure a rigid connection between these parts.

To remove the universal-joint assembly described the bolts 13 will first be removed, thereby allowing the front end of the assembly to be lowered, the necessary clearance between the flanges 11 and 12 being afforded by a certain amount of play provided for in the propeller shaft slip joint as is well known in this art. The bolts 27 will then be removed, thereby permitting removal of the propeller shaft and front universal-joint as an entirety by withdrawing the propeller shaft forwardly from the yoke hub 24. A tool may now be inserted through said hub 24 for removing the nut 19. This tool may either be a large screw driver adapted to enter a slot 28 in the castellated nut or it may be a spanner wrench adapted to fit over the nut. The former construction is preferred with the present design of universal-joint because the dimensions thereof practically prohibit the use of a spanner wrench, whereas with universal-joints of other designs and of a larger size it will be manifest that clearance may be provided around the nut for reception of the wrench head. Upon removing the nut 19 the rear universal-joint may obviously be removed as an entirety. To install the assembly these steps or operations will obviously be reversed.

By reason of the foregoing construction and arrangement of parts the installation of universal-joint assemblies is greatly facilitated for the reason that it is not necessary to disassemble either of the universal-joints and, furthermore, the construction is materially simplified by the elimination of at least one set of flanged coupling members.

I claim as my invention:

A universal joint assembly for connecting fixedly spaced but relatively movable driving and driven shafts, the said assembly comprising two universal joints for connection with the pair of shafts, and an intermediate floating shaft connecting the two joints, the outer yoke of the one joint being fastened rigidly by means of a nut directly to the one shaft of the pair, the inner yoke of said joint affording access therethrough to permit the application of the nut onto the threaded end of said shaft to fasten the joint thereto, the one end of the intermediate shaft being entered and fastened rigidly in the inner yoke of said joint when the joint is in its assembled position, the other end of said intermediate shaft having a telescoping fit in the inner yoke of the other joint, the said yoke being elongated to afford the range of telescoping action required in operation, and means for fastening the outer yoke of said joint to the end of the other shaft of the pair so as to permit bringing the parts sidewise into coupling relation, comprising a pair of coupling flanges, one provided on the yoke of said joint and the other provided on a part fixed on said shaft, and bolts passing through said flanges for fastening the same together.

CARL E. SWENSON.